(12) United States Patent
Hill

(10) Patent No.: US 8,739,436 B2
(45) Date of Patent: Jun. 3, 2014

(54) QUICK-ATTACH ASSEMBLY FOR ATTACHING AN IMPLEMENT TO AN OFF-ROAD VEHICLE

(76) Inventor: Curt J. Hill, Warba, MN (US)

( * ) Notice: Subject to any disclaimer, the term of this patent is extended or adjusted under 35 U.S.C. 154(b) by 428 days.

(21) Appl. No.: 13/135,042

(22) Filed: Jun. 23, 2011

(65) Prior Publication Data

US 2012/0121321 A1    May 17, 2012

Related U.S. Application Data

(63) Continuation-in-part of application No. 12/927,346, filed on Nov. 12, 2010, now Pat. No. 8,381,422.

(51) Int. Cl.
*E01H 5/04* (2006.01)

(52) U.S. Cl.
USPC .............................. 37/231; 37/468; 172/817

(58) Field of Classification Search
USPC ...................... 172/810, 811, 817; 37/231, 468
See application file for complete search history.

(56) References Cited

U.S. PATENT DOCUMENTS

| 3,410,008 | A |   | 11/1968 | Standfuss |
| 3,815,687 | A |   | 6/1974 | Federspiel |
| 4,747,612 | A |   | 5/1988 | Kuhn |
| 4,778,195 | A | * | 10/1988 | Vachon ............................. 280/477 |
| 4,976,053 | A |   | 12/1990 | Caley |
| 5,082,389 | A |   | 1/1992 | Balemi |
| 5,141,385 | A |   | 8/1992 | Tibbatts et al. |
| 5,244,047 | A |   | 9/1993 | Eudy |
| 5,815,956 | A |   | 10/1998 | Lavin et al. |
| 6,138,770 | A |   | 10/2000 | Kayser |
| 6,145,222 | A |   | 11/2000 | Curtis |
| 6,170,178 | B1 |   | 1/2001 | Christy |
| 6,615,513 | B2 |   | 9/2003 | Quenzi et al. |
| 6,843,002 | B1 |   | 1/2005 | Moffitt |
| 6,928,757 | B2 |   | 8/2005 | Bloxdorf et al. |
| 6,957,505 | B1 |   | 10/2005 | Moffitt |
| 7,063,169 | B2 | * | 6/2006 | Elliott .......................... 172/445.1 |
| 7,523,568 | B2 | * | 4/2009 | Willey ............................... 37/231 |

* cited by examiner

*Primary Examiner* — Jamie L McGowan
(74) *Attorney, Agent, or Firm* — Dennis L. Thomte; Thomte Patent Law Office LLC

(57) ABSTRACT

A quick-attach assembly for quickly and easily securing an implement to the forward end of a push tube assembly mounted on an off-road vehicle. A rear quick-attach assembly is secured to the forward end of the push tube assembly and a rear quick-attach assembly is secured to the rearward end of the implement. When connected together, the rear quick-attach assembly is received within the front quick-attach assembly.

2 Claims, 4 Drawing Sheets

QUICK-ATTACH ASSEMBLY FOR ATTACHING AN IMPLEMENT TO AN OFF-ROAD VEHICLE

CROSS-REFERENCE TO RELATED APPLICATION

This application is a continuation-in-part application of Ser. No. 12/927,346, filed on Nov. 12, 2010 now U.S. Pat. No. 8,381,422, entitled METHOD AND MEANS FOR CONVERTING A BLADE ATTACHMENT OF AN OFF-ROAD VEHICLE TO A QUICK-ATTACH BLADE.

BACKGROUND OF THE INVENTION

1. Field of the Invention

This invention relates to a quick-attach assembly for attaching an implement such as a plow blade to an off-road vehicle such as an ATV, UTV, riding mower or a garden tractor.

2. Description of the Related Art

In recent years, it has become common to mount a plow blade or other implement on the forward end of an off-road vehicle such as an ATV, UTV, riding mower or garden tractor. Most manufacturers utilize an elongated push tube assembly to mount the plow blade or implement to the vehicle. In most prior art plow blades, the rearward ends of the push tube assembly are pivoted to the vehicle about a transverse horizontal axis to permit the forward end of the push tube assembly, and the plow blade secured thereto, to be raised and lowered. In some cases, the rearward ends of the push tubes of the push tube assembly are quickly attachable to the vehicle. Generally speaking, in most prior art plow blade attachment devices, a flat base plate is secured to the forward ends of the push tubes with a blade pivot or blade swivel assembly being horizontally pivotally mounted, about a vertical axis, to the base plate so that the angle of the blade may be selectively changed. The plow blade is hingedly secured to the blade pivot assembly so that the pitch of the plow blade may be changed and so that the upper end of the plow blade may pivot forwardly with respect to the blade pivot and so that the lower end of the plow blade may pivot rearwardly should the lower end of the plow blade strike an obstruction.

Although the blade or implement attachments of the prior art perform satisfactorily, to the best of Applicant's knowledge, the plow blades or implements thereof are not quickly removably secured to the forward end of the push tube assembly. Thus, although the entire plow blade and its attachment structure may be fairly quickly attached to the vehicle, the push tube assembly cannot be used for any other purpose. Therefore, if other implements are to be mounted on the forward end of the vehicle, each of those implements must have a push tube assembly designed for the particular vehicle to which the implement is to be attached.

The invention of Applicant's co-pending application solved most, if not all, problems of the prior art. However, in Applicant's earlier invention, the forwardly extending tubes of the rear adapter assembly must be fairly precisely positioned or aligned with respect to the rearwardly extending receiver tubes of the front adapter assembly to enable the forwardly extending tubes to be received in the rearwardly extending receiver tubes.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In the instant application, a rear quick-attach assembly is substituted for the rear adapter assembly of the co-pending application and a front quick-attach assembly is substituted for the front adapter assembly of the co-pending application. The rear quick-attach assembly is secured to the forward end of the push tube assembly and includes forwardly extending and horizontally spaced-apart first and second tubular members having forward and rearward ends. The first tubular member has inner and outer side walls with the side walls extending forwardly and inwardly in a tapered fashion from the rearward end to the forward end thereof. The second tubular member also has inner and outer side walls with the side walls extending forwardly and inwardly in a tapered fashion from the rearward end to the forward end thereof. The lower ends of the inner and outer side walls of the first and second tubular members are also tapered upwardly at the rearward end thereof.

The front quick-attach assembly includes a rearwardly projecting pocket or housing having a top wall, a first side wall, a second side wall and a bottom wall. The front quick-attach assembly is adapted to be secured to an implement such as a plow blade, sweeper, etc. The first side wall of the pocket extends rearwardly and outwardly from the forward end to the rearward end thereof in a tapered fashion. The second side wall of the pocket extends rearwardly and outwardly from the forward end to the rearward end thereof in a tapered fashion. The first and second tubular members of the rear quick-attach assembly are receivable by the open rearward end of the pocket. The outer side walls of the first and second tubular members are closely positioned at the inner surfaces of the first and second side walls of the pocket when the first and second tubular members are received by the pocket. Means is provided for selectively securing the rear and front quick-attach assemblies together.

It is therefore a principal object of the invention to provide a quick-attach assembly for attaching an implement to an off-road vehicle.

A further object of the invention is to provide a quick-attach assembly for an off-road vehicle which includes a rear quick-attach assembly secured to the forward end of a push tube assembly and a front quick-attach assembly which is attached to an implement with the quick-attach assemblies being designed to quickly and easily connect the rear quick-attach assembly to the front quick-attach assembly.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 2:
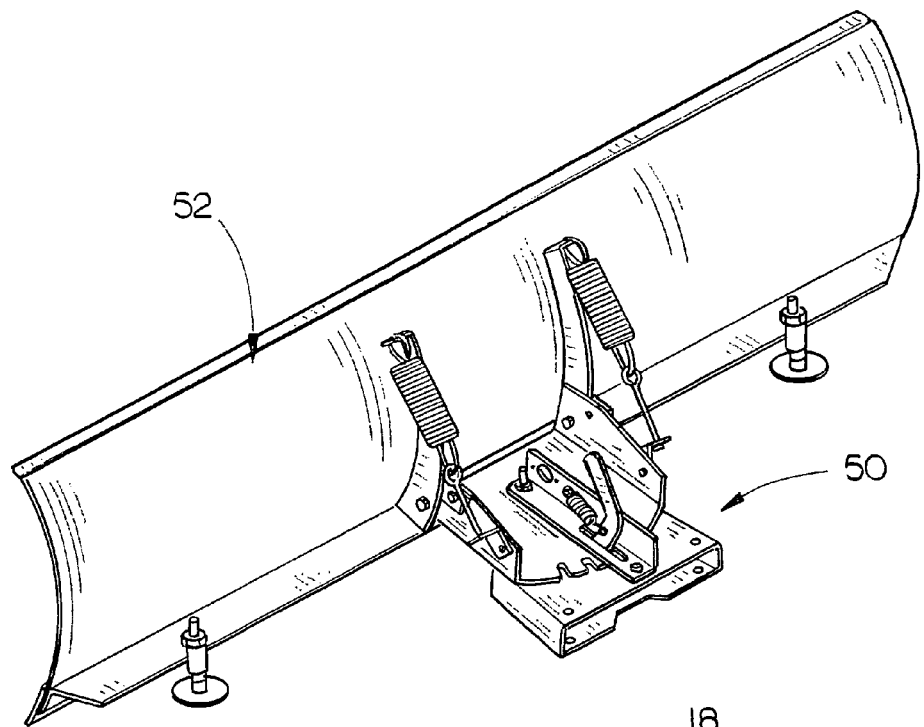
FIG. 2 is a rear perspective view illustrating an implement such as a plow blade assembly having the front quick-attach assembly secured to the rearward end thereof.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The disclosure of the co-pending application is incorporated herein by reference to complete the disclosure of the instant invention if required.

In the drawings of the co-pending application, a conventional off-road vehicle such as an ATV is illustrated. The invention of the co-pending application and the instant invention may also be used on a UTV, small tractor or riding lawn mower.

Figure 1:
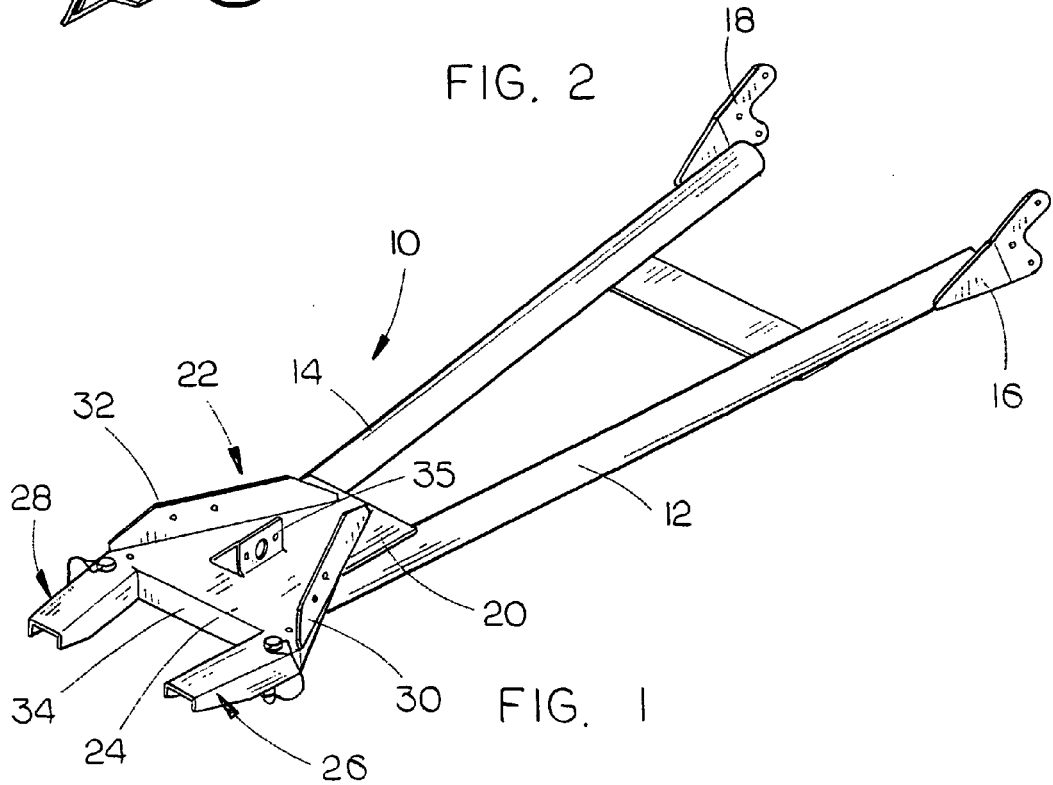
FIG. 1 is a front perspective view of a push tube assembly having the rear quick-attach assembly secured to the forward end thereof.

In FIG. 1, the numeral 10 refers to a push tube assembly including push tubes 12 and 14. The rearward ends of push tubes 12 and 14 have mounting brackets 16 and 18 secured thereto respectively for attachment to a mount at the underside of the off-road vehicle. Plate 20 is secured to the forward end of push tubes 12 and 14. A rear quick-attach assembly 22 is secured to plate 20 by any convenient means such as by bolts or welding. Assembly 22 includes a generally flat plate portion 24 having tubular members 26 and 28 extending forwardly therefrom. Reinforcing plates 30 and 32 extend upwardly from plate portion 24 as seen in FIG. 1. A reinforcing plate 34 is secured to the forward end of plate portion 24 by welding. Plate portion 24 has a bracket 35 extending upwardly therefrom which is adapted to have a winch cable secured thereto.

Figure 3:
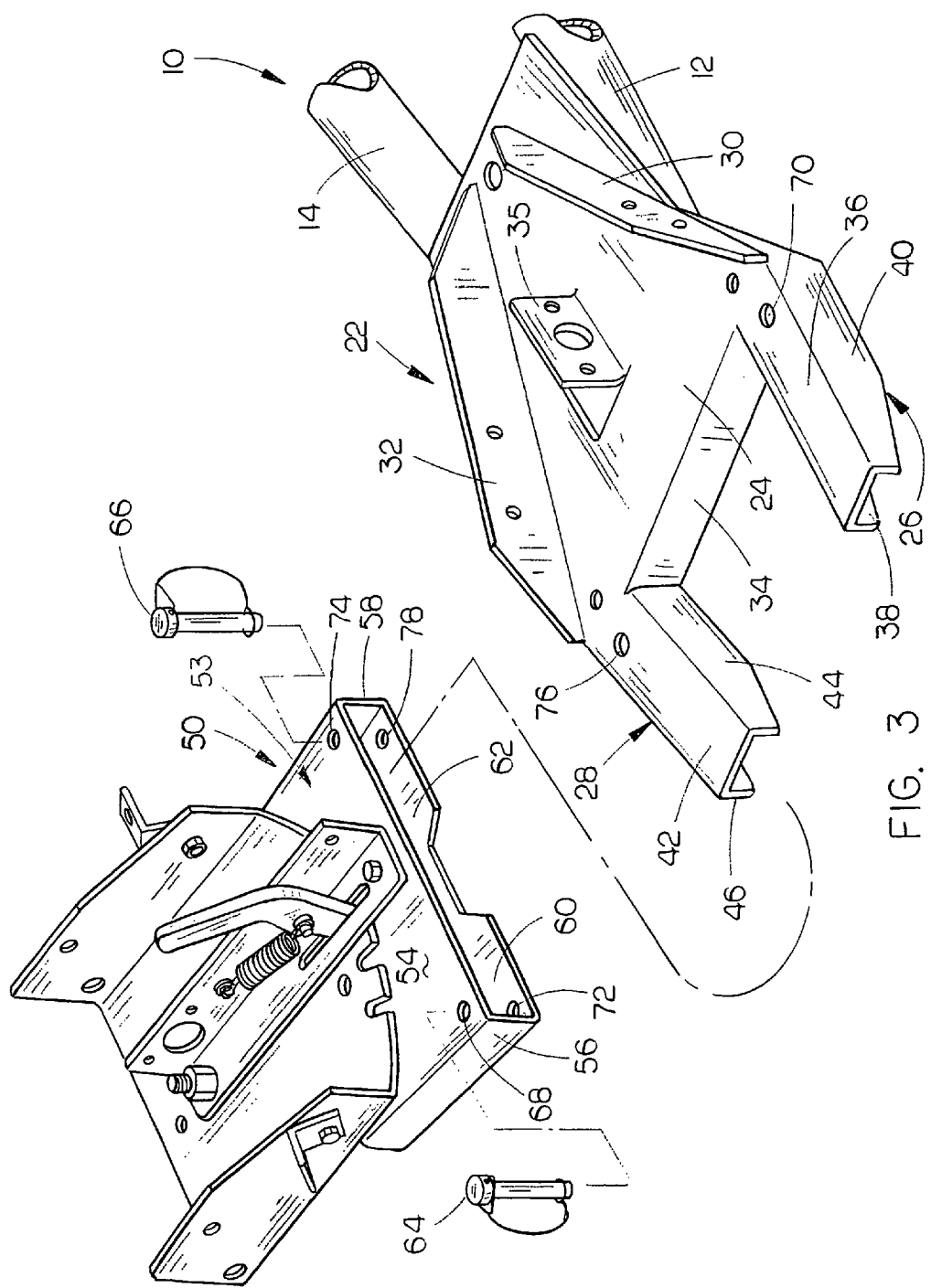
FIG. 3 is a perspective view of the rear and front quick-attach assemblies of this invention.
Figure 4:
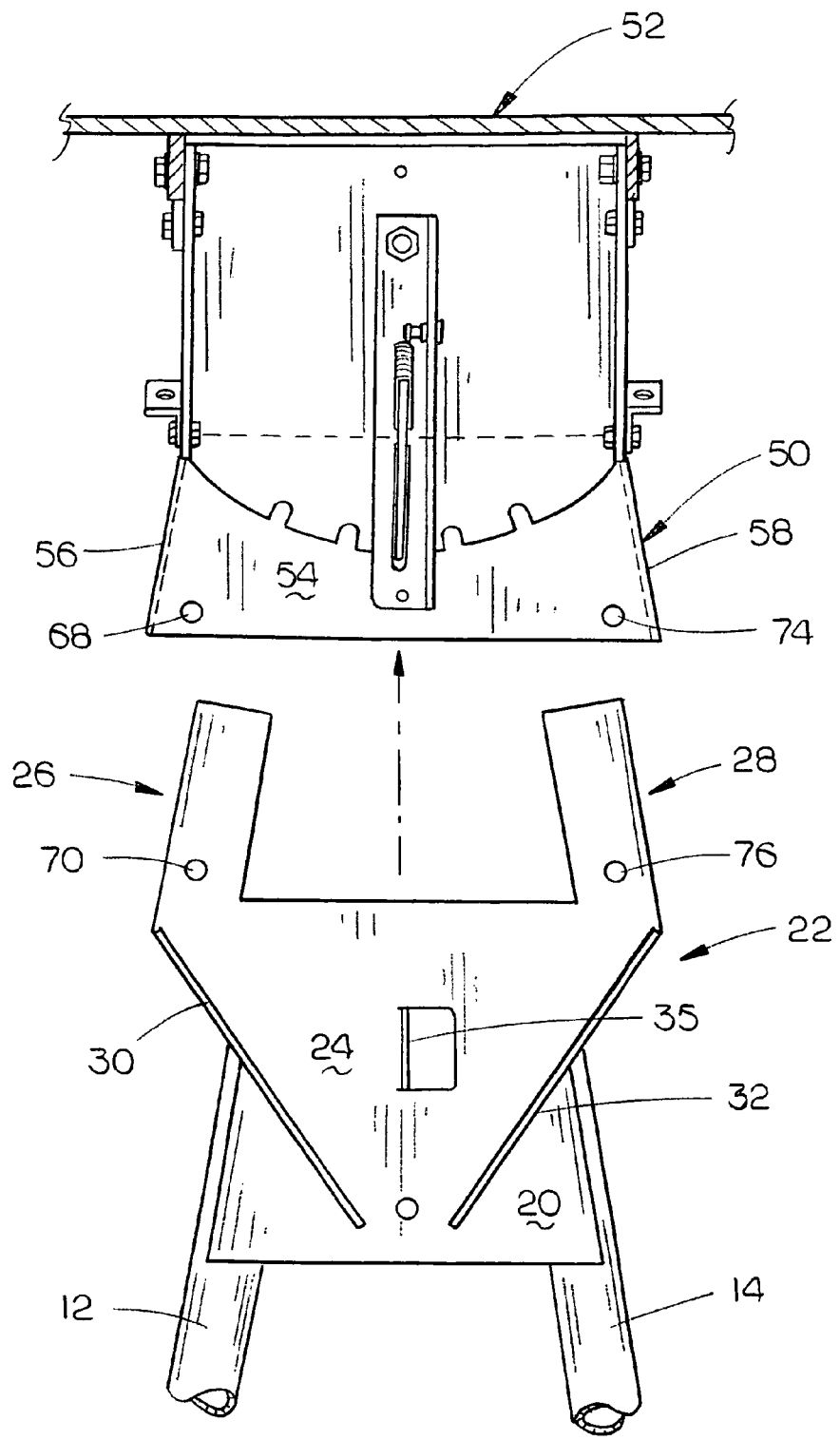
FIG. 4 is a top elevational view of the rear and front quick-attach assemblies.
Figure 5:
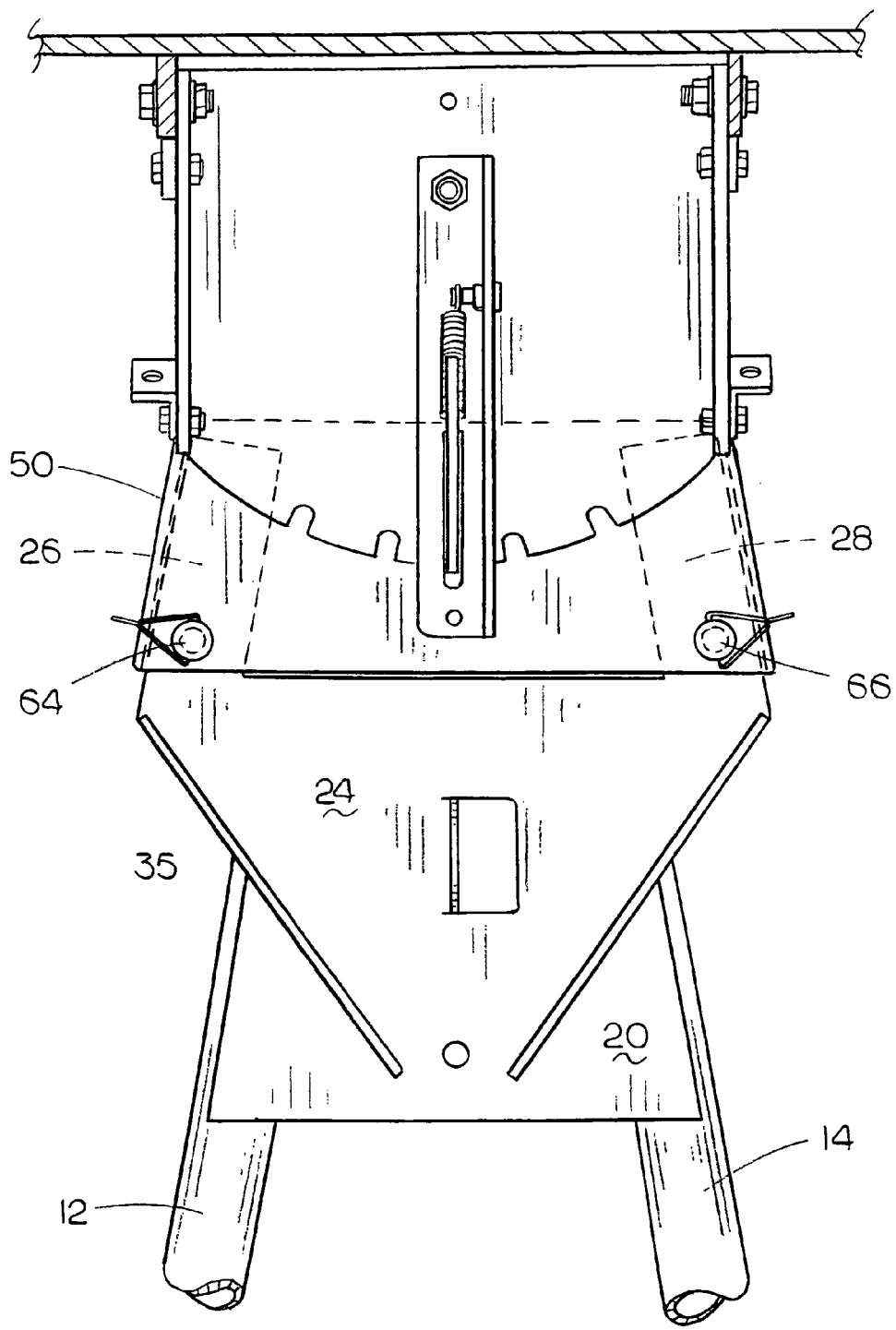
FIG. 5 is a top elevational view of the rear and front quick-attach assemblies being connected together.

Tubular member 26 includes a top wall 36, an inner wall 38 extending downwardly from the inner side of top wall 36, and an outer wall 40 extending downwardly from the outer side of top wall 126. As seen, inner wall 38 extends forwardly and laterally inwardly from plate portion 24. Outer wall 40 extends forwardly and laterally inwardly from plate portion 24. Although it is preferred that inner wall 38 extends forwardly and laterally inwardly from plate portion 24, inner wall 38 could extend forwardly from plate portion 24. As seen in FIG. 3, the lower ends of inner wall 38 and outer wall 40 have upwardly tapered portions at their forward ends.

Tubular member 28 includes a top wall 42, an inner wall 44 extending downwardly from the inner side of top wall 42, an outer wall 46 extending downwardly from the outer side of top wall 42. As seen, inner wall 44 extends forwardly and laterally inwardly from plate portion 24. Outer wall 46 extends forwardly and laterally inwardly from plate portion 24. Although it is preferred that inner wall 44 extend forwardly and laterally inwardly from plate portion 24, inner wall 44 could extend forwardly from plate portion 24. As seen in FIG. 3, the lower ends of inner wall 44 and outer wall 46 have upwardly tapered portions at their forward ends. Plate portion 24 and tubular members 26 and 28 may be of one-piece construction. The reinforcing plates 30 and 32 may be bent upwardly from plate portion 24 or may be separate components welded to plate portion 24.

The numeral 50 refers to a front quick-attach assembly which is secured to the rearward end of an implement such as a plow blade assembly 52. Assembly 50 includes a housing 53 having a top wall 54, side walls 56 and 58, and bottom wall 60 which define a rearwardly facing pocket 62. Side wall 56 extends rearwardly and laterally outwardly from its forward end to its rearward end. Side wall 58 extends rearwardly and laterally outwardly from its forward end to its rearward end. The angles of side walls 56 and 58 match the angles of outer walls 40 and 46 of tubular members 26 and 28 respectively.

The implement or plow blade assembly 52 is attached to the vehicle as will now be described. The vehicle is driven forwardly with respect to the implement so that the forward ends of tubular members 26 and 28 of the rear quick-attach assembly 22 are generally aligned with the pocket 62 of front quick-attach assembly 50. The winch of the vehicle is employed to raise or lower the forward end of the push tube assembly 10 and the rear quick-attach assembly 22 to achieve the vertical alignment of the tubular members 26 and 28 with the pocket 62. The vehicle is then driven forwardly so that the tubular members 26 and 28 are received by the pocket 62. The fact that the outer side walls 40 and 46 of tubular members 26 and 28 respectively are tapered inwardly from the rearward to forward ends thereof results in the distance between the forward ends thereof being less than the distance between the rearward ends of side walls 56 and 58 of front quick-attach assembly 50 which enables the quick-attach assemblies 22 and 50 to be connected together without perfect alignment therebetween. The tapered lower ends of the forward ends of the side walls of tubular members 26 and 28 also facilitate ease of connection therebetween.

When rear quick-attach assembly 112 is completely received by the front quick-attach assembly 50, the assemblies are secured together by pins 64 and 66. Pin 64 is extended downwardly through opening 68 in top wall 54 of quick-attach assembly 50, through opening 70 in top 36 of tubular member 26 and through opening 72 in bottom wall 60 of quick-attach assembly 50. Pin 66 is extended downwardly through opening 74 in top wall 54 of quick-attach assembly 50, through opening 76 in top wall 42 of the tubular member 28 and through opening 78 in bottom wall 60 of quick-attach assembly 50. When secured together, the outer walls of tubular members 26 and 28 are closely positioned with respect to the inner surfaces of the side walls 56 and 58 of front-attach assembly 50 so that there is very little, if any, "play" therebetween.

Although it has been described that the quick-attach assemblies 22 and 50 are located at the front of the vehicle, the assemblies 22 and 50 could also be used at the rearward end of the vehicle.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. In combination with an off-road vehicle having forward and rearward ends;

an elongated push tube assembly having rearward and forward ends;

said rearward end of said push tube assembly being secured to the off-road vehicle so that the forward end of said push tube assembly is positioned at the forward end of the vehicle;

a rear male quick-attach assembly secured to the forward end of said push tube assembly;

said rear male quick-attach assembly including forwardly extending and horizontally spaced-apart first and second tubular members having forward and rearward ends;

said first tubular member having a top wall with inner and outer sides, an inner side wall extending downwardly from said inner side of said top wall, and an outer side wall extending downwardly from said outer side of said top wall;

said top wall of said first tubular member having a first pin opening formed therein adjacent said rearward end thereof;

said outer side wall of said first tubular member extending forwardly and laterally inwardly from said rearward end to said forward end of said first tubular member;

said second tubular member having a top wall with inner and outer sides, an inner side wall extending downwardly from said inner side of said top wall, and an outer side wall extending downwardly from said outer side of said top wall;

said top wall of said second tubular member having a second pin opening formed therein adjacent said rearward end thereof;

said outer side wall of said second tubular member extending forwardly and inwardly from said rearward end to said forward end of said second tubular member;

a front female quick-attach assembly having a forward end, a rearward end, and a rearwardly projecting housing having a top wall, a first side wall, a second side wall, a bottom wall and an open rearward end;

said top wall of said housing having a first pin opening formed therein adjacent said rearward end thereof adjacent said first side wall thereof;

said top wall of said housing having a second pin opening formed therein adjacent said rearward end thereof adjacent said second side wall thereof;

said front female quick-attach assembly adapted to have an implement secured thereto;

said first side wall of said housing extending rearwardly and outwardly from said forward end to said rearward end thereof;

said second side wall of said housing extending rearwardly and outwardly from said forward end to said rearward end thereof;

said first and second tubular members of said rear male quick-attach assembly being receivable by said open rearward end of said housing;

said outer side walls of said first and second tubular members being closely positioned to the inner surfaces of said first and second side walls of said housing when said first and second tubular members are received by said housing;

a first locking pin extending downwardly through said first pin opening in said top wall of said housing and downwardly through said first pin opening in said first tubular member when said first and second tubular members are received by said housing; and a second locking pin extending downwardly through said second pin opening in said top wall of said housing and downwardly through said second pin opening in said second tubular member when said first and second tubular members are received by said housing;

said first and second locking pins selectively securing said rear male and front female quick-attach assemblies together.

2. The combination of claim 1 wherein said inner and outer side walls of said first and second tubular members have upwardly and forwardly extending tapered lower ends.

* * * * *